United States Patent
Wozniak et al.

(10) Patent No.: US 10,936,452 B2
(45) Date of Patent: Mar. 2, 2021

(54) DISPERSED STORAGE NETWORK FAILOVER UNITS USED TO IMPROVE LOCAL RELIABILITY

(71) Applicant: International Business Machines Corporation, Armonk, NY (US)

(72) Inventors: Ethan S. Wozniak, Park Ridge, IL (US); Praveen Viraraghavan, Chicago, IL (US); Asimuddin Kazi, Naperville, IL (US); Michael J. Niedbala, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 16/190,255

(22) Filed: Nov. 14, 2018

(65) Prior Publication Data
US 2020/0151068 A1  May 14, 2020

(51) Int. Cl.
G06F 11/14 (2006.01)
G06F 11/20 (2006.01)

(52) U.S. Cl.
CPC ...... *G06F 11/2092* (2013.01); *G06F 11/1415* (2013.01); *G06F 2201/85* (2013.01)

(58) Field of Classification Search
CPC ............. G06F 11/2092; G06F 11/1415; G06F 2201/85; G06F 11/1076; G06F 11/1084; G06F 11/1088; G06F 11/1092; G06F 11/2023; G06F 11/2094
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |

(Continued)

FOREIGN PATENT DOCUMENTS

WO  2009079177  6/2009

OTHER PUBLICATIONS

Chung; An Automatic Data Segmentation Method for 3D Measured Data Points; National Taiwan University; pp. 1-8; 1998.

(Continued)

*Primary Examiner* — Kamini B Patel
(74) *Attorney, Agent, or Firm* — James Nock; Andrew D. Wright; Roberts Calderon Safran & Cole, P.C.

(57) ABSTRACT

A method for execution by one or more processing modules of one or more computing devices of a dispersed storage network (DSN), the method begins by detecting a failure (partial or full) of a dispersed storage (DS) unit memory device within the DSN. The method continues by tracking namespace ranges of encoded data slices intended for access in the failed DS unit memory device. The method continues by redirecting access of the encoded data slices reflected by the namespace ranges from the failed DS unit memory device to a failover DS unit memory device.

20 Claims, 7 Drawing Sheets

(56) References Cited

U.S. PATENT DOCUMENTS

| | | | |
|---|---|---|---|
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,100,070 B2 | 8/2006 | Iwamura et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,401,114 B1 | 7/2008 | Block et al. | |
| 7,636,724 B2 | 12/2009 | de la Torre et al. | |
| 7,668,962 B2 | 2/2010 | Tran et al. | |
| 7,734,951 B1* | 6/2010 | Balasubramanian | G06F 11/1435 714/15 |
| 8,122,284 B2 | 2/2012 | Taylor et al. | |
| 8,645,654 B1 | 2/2014 | Bailey et al. | |
| 8,839,028 B1 | 9/2014 | Polia et al. | |
| 9,817,727 B2 | 11/2017 | McAlister et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0145314 A1 | 7/2003 | Nguyen et al. | |
| 2004/0024963 A1 | 2/2004 | Talagala et al. | |
| 2004/0078397 A1* | 4/2004 | Mehta | G06F 11/2097 |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0033933 A1 | 2/2005 | Hetrick et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0022121 A1 | 1/2007 | Bahar et al. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0006888 A1* | 1/2009 | Bernhard | G06F 11/08 714/6.12 |
| 2009/0094251 A1 | 4/2009 | Gladwin et al. | |
| 2009/0094318 A1 | 4/2009 | Gladwin et al. | |
| 2009/0249001 A1 | 10/2009 | Narayanan et al. | |
| 2010/0023524 A1 | 1/2010 | Gladwin et al. | |
| 2014/0244788 A1 | 8/2014 | Resch et al. | |
| 2015/0378822 A1* | 12/2015 | Grube | G06F 11/1076 714/763 |
| 2016/0292254 A1* | 10/2016 | Dhuse | G06F 16/2272 |
| 2017/0123975 A1 | 5/2017 | Tseng et al. | |
| 2017/0123976 A1* | 5/2017 | Motwani | G06F 11/1092 |
| 2017/0132095 A1* | 5/2017 | Graefe | G06F 11/1662 |
| 2017/0169048 A1* | 6/2017 | Fathalla | G06F 16/176 |
| 2017/0192866 A1 | 7/2017 | Vijayan et al. | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Wood et al.; Disaster Recovery as a Cloud Service: Economic Benefits Deployment Challenges; 2010; 7 pages [downloaded from: https://www.usenix.org/legacy/event/hotcloud10/tech/full_papers/Wood.pdf].

Zeilenga; Lightweight Directory Access Protocol (LDAP): String Representation of Distinguished Names; IETF Network Network Working Group; RFC 4514; Jun. 2006; pp. 1-15.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.

* cited by examiner

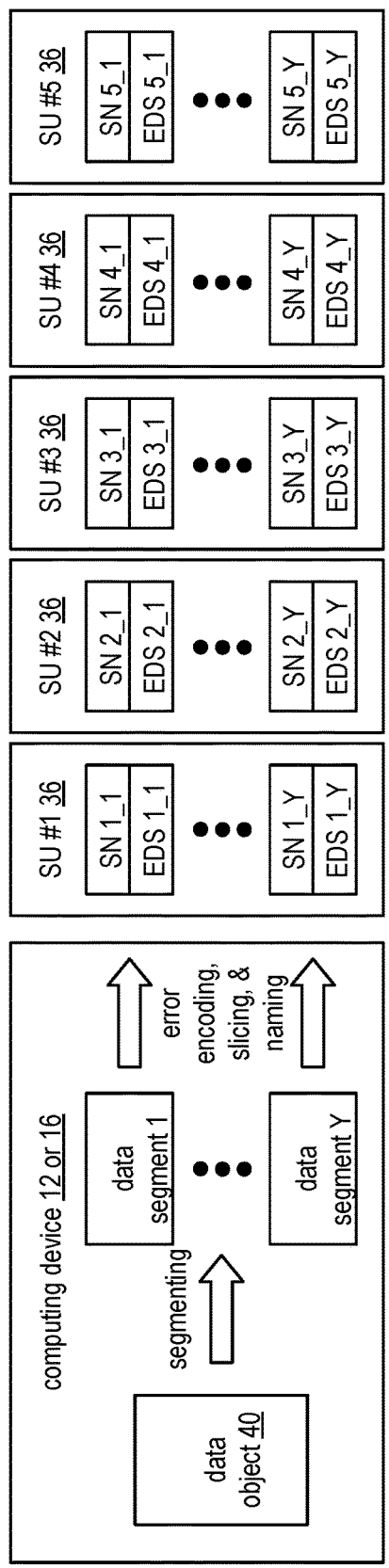
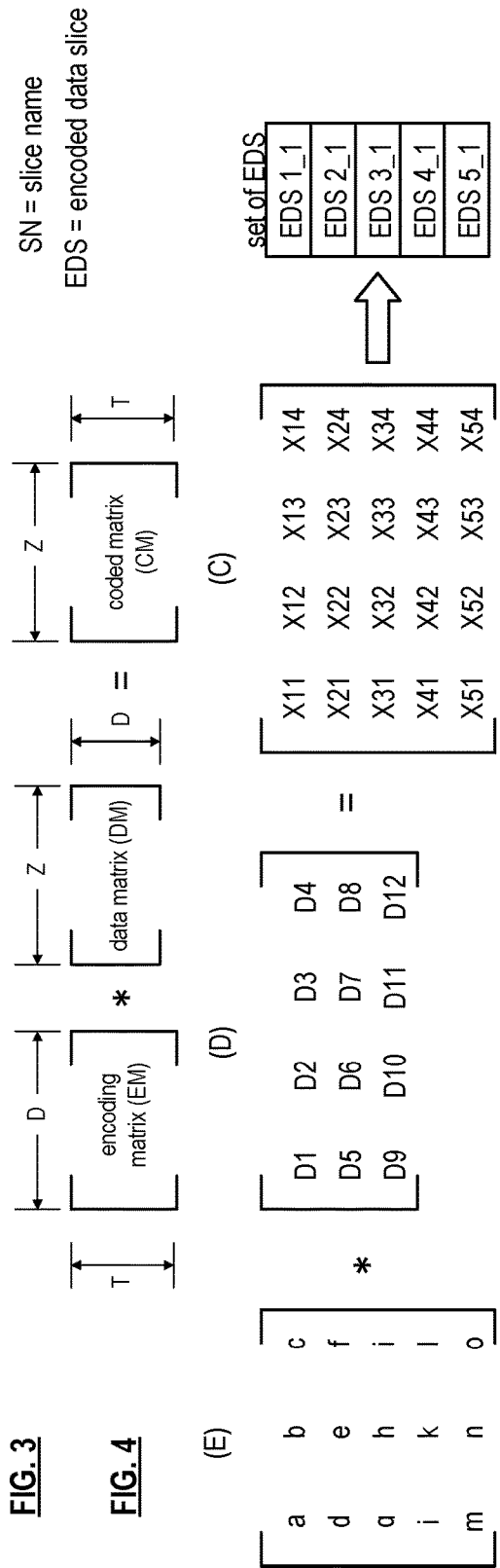
FIG. 3
FIG. 4
FIG. 5
FIG. 6

DISPERSED STORAGE NETWORK FAILOVER UNITS USED TO IMPROVE LOCAL RELIABILITY

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
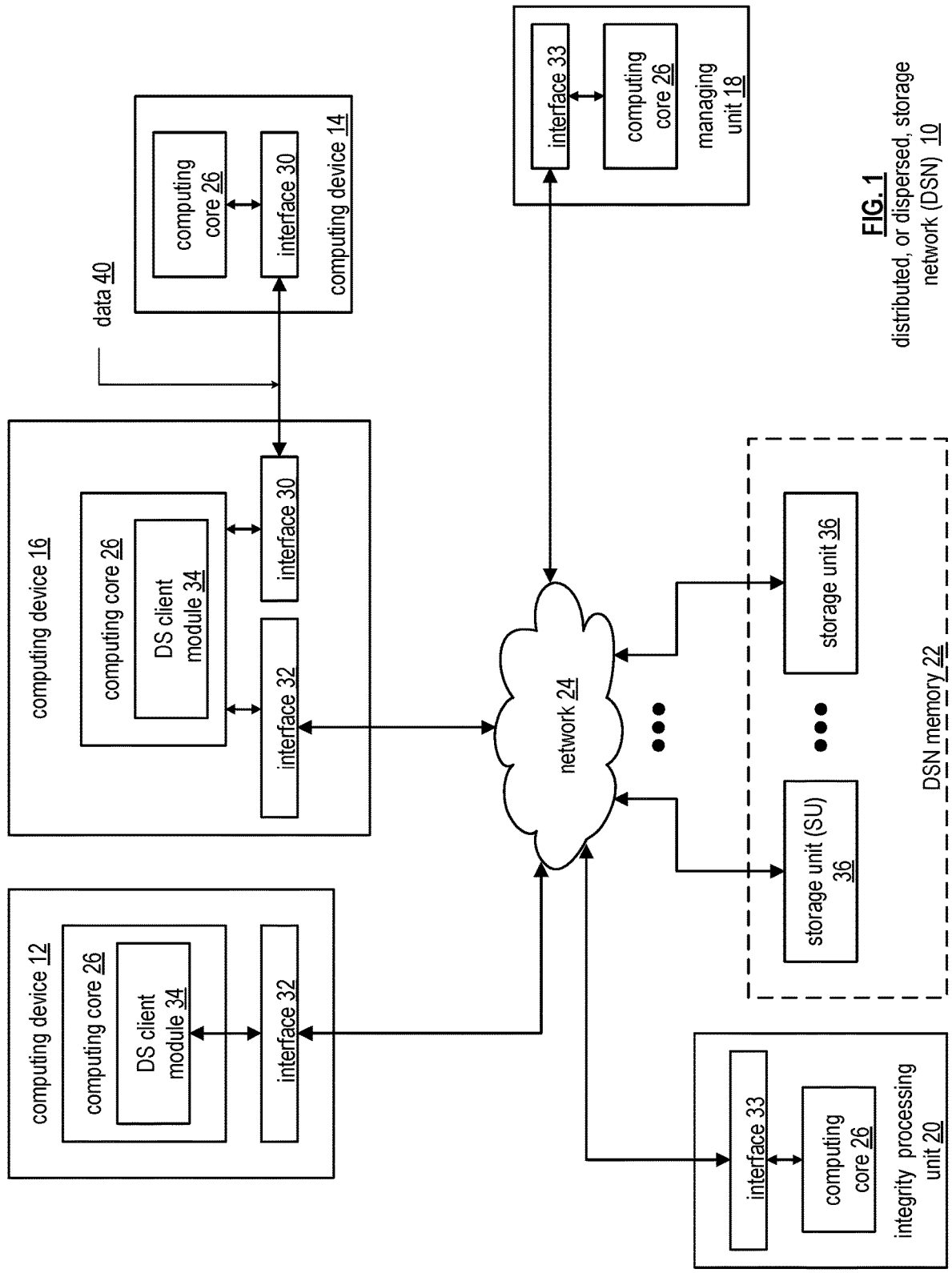
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
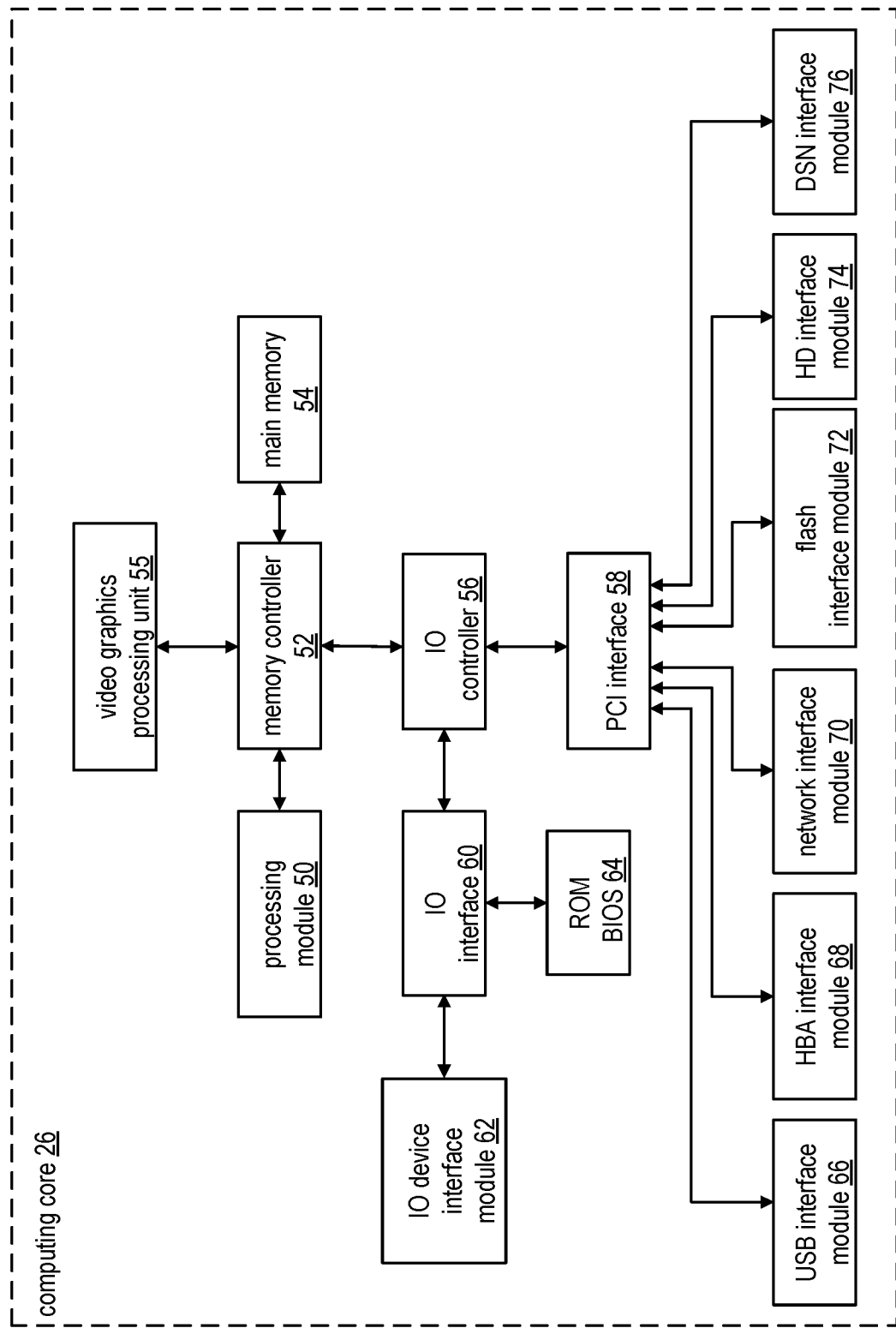
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-9C. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
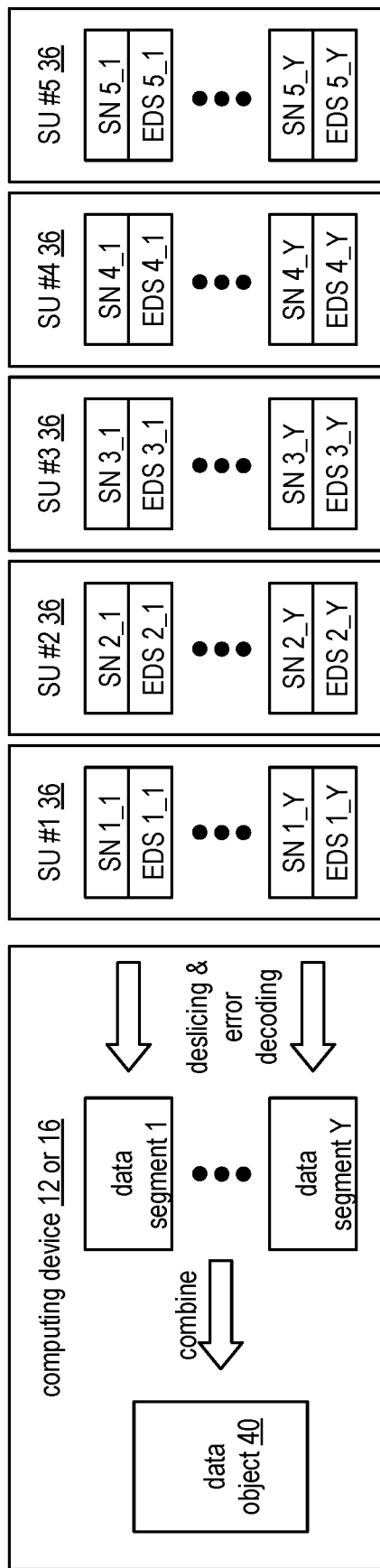
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
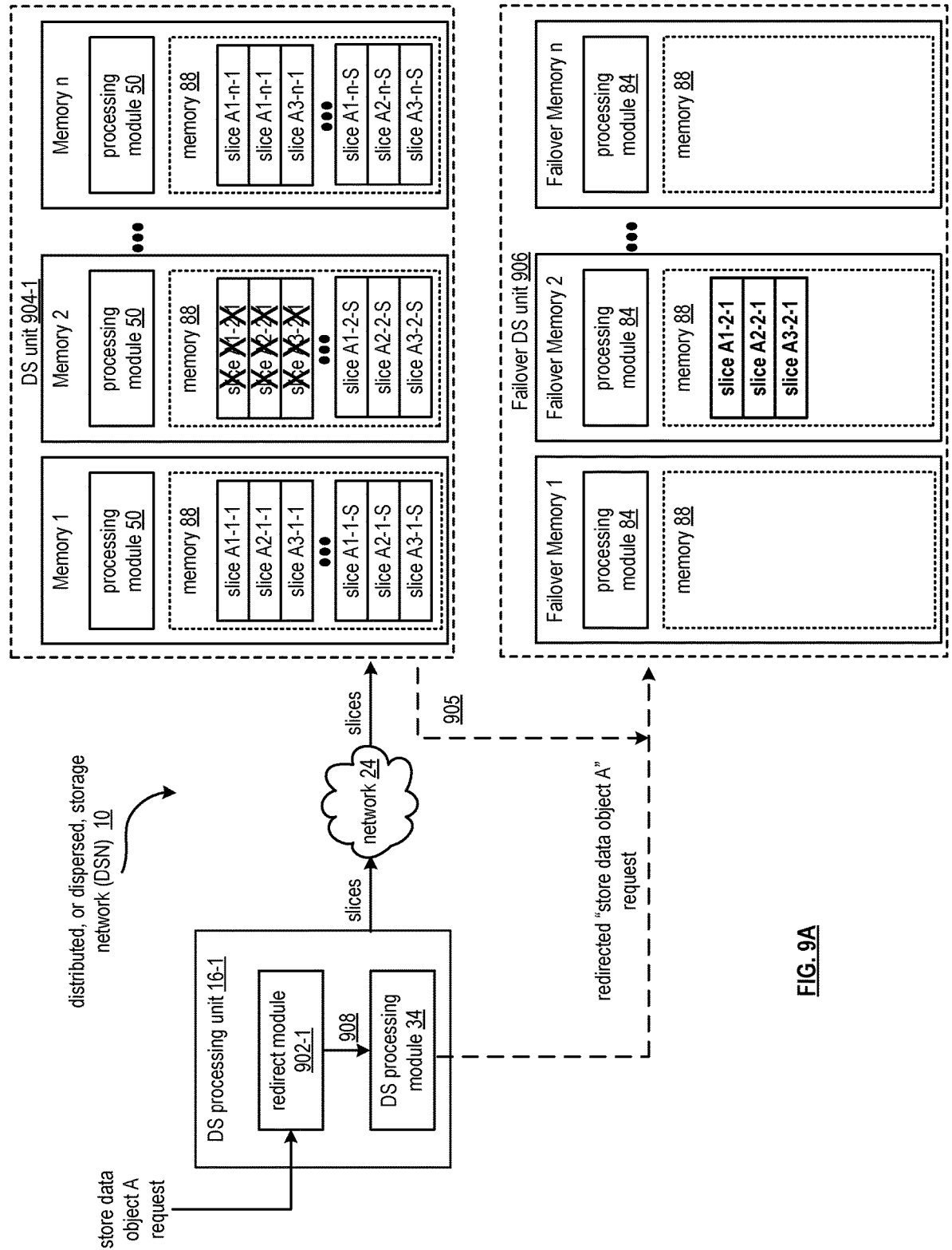
FIG. 9A is a schematic block diagram illustrating an example of implementing DSN failover units in accordance with the present invention.
Figure 9B:
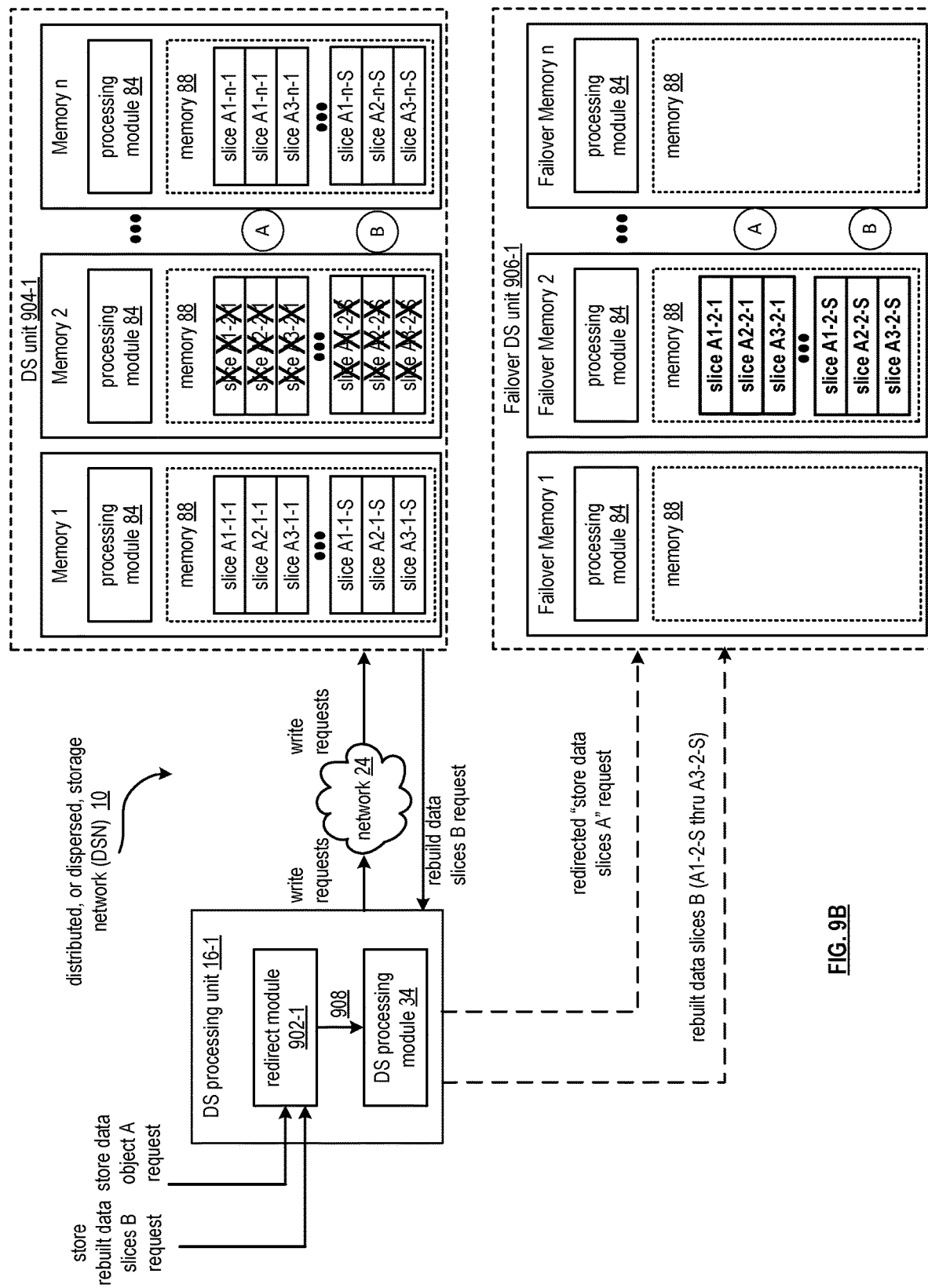
FIG. 9B is another schematic block diagram illustrating an example of implementing DSN failover units in accordance with the present invention.

FIGS. 9A-9B reflect schematic block diagrams of a dispersed/distributed storage network (DSN) utilizing failover DS units (storage units 36) for situations where a DS unit has a full or partial failure in one or more of its memory devices (e.g., hard drive). In case of a full or partial failure, the encoded data slices that would have been stored on the failed memory devices are redirected to a failover DS unit.

In one embodiment, a redirect module of a DS processing unit tracks namespace ranges (portion of namespace) that are then redirected to the failover DS units by sending encoded data slices to them. In an alternate embodiment, DS units with the failed memory devices send the encoded data slices, that would have been written to the failed memory devices, directly to the failover DS units. However, it also is considered within the scope of the present technology described herein to redirect the encoded data slices, reflected in the namespace ranges, from the failed memory device for partial failures (memory device still operational) or from a DS processing unit for full failures.

If there is an increased number failures of memory devices within DS units, the number of failover DS units can be scaled accordingly to meet the ongoing demand. When retrieving encode data slices, either the DS processing unit will retrieve slices from the failover DS units directly in order to reconstitute the data, or DS units request the encoded data slices directly from the failover DS units when they receive a request from a DS processing unit that would have been directed to the failed memory device.

In an alternative embodiment, the method is implemented when a DS unit detects that a memory device is close to failure. The DS unit can proactively move as much data as possible from the memory device to the failover DS unit (before failure), and then designate the memory device as failed so that it receives no further data. One example of "close to failure" is a hard drive approaching a full status.

The failover DS units can also be used to protect against full DS unit failures. The DS failover unit would come online, and all new encoded data slices would be redirected to the failover unit by DS processing units and all encoded data slices missing from the failed DS unit memory devices would be rebuilt using the IDA (information dispersal algorithm) as previously discussed in FIGS. 3-7.

This method can have multiple benefits. First, compared to moving data to other memory devices in the same DS unit, this method can avoid causing memory devices in the DS unit to have higher fill and workloads than memory devices in other DS units, which can lead to write failures as the memory devices approach a full status. Second, in cases where a DS unit is storing multiple slices from an error coding function for some data, then moving data from a failed memory device to another memory device in the same DS unit could lead to multiple slices from the error coding function for some data to be on the same memory device, which means multiple slices would be at risk if that memory device were to fail.

FIG. 9A is a schematic block diagram of a dispersed/distributed storage network (DSN) utilizing failover DS units (e.g., storage units 36) for situations where a DS unit has a partial failure in one or more of its memory devices (e.g., hard drive). In particular, a system and method is presented for use in conjunction with one or more functions and features described in conjunction with FIGS. 1-2, 3-8 and also FIGS. 9B and 9C.

This embodiment of a dispersed storage network (DSN) includes network 24 of FIG. 1, a plurality of memories 1-$n$ located in DS unit 904-1. DS processing unit 16-1 (computing device) includes DS client module 34 and computer memory (54—FIG. 2, not shown). Each storage unit 904-1 includes processing module 50 and memory 88 (e.g., hard drive, static memory, solid state memory, optical storage, etc.). Hereafter, each DS unit may be interchangeably referred to as a storage unit 36 and each storage set may be interchangeably referred to as a set of storage units.

From time-to-time, one or more memory devices (memory 1-$n$) in a target DS unit 904-1 may enter a degraded mode or a degraded state. Examples of these degraded modes/states include: when one or more memory devices within storage unit 36 is undergoing an update or upgrade, is approaching a full status or is full, is restarting or resetting its state, suffers an irrecoverable fault, or is initializing, etc. In general, a degraded mode/state includes allowances for limited continued usage (operational) of the memory devices, but with lower performance (e.g., not able to process all requests) or even with severe or minimum performance (e.g., temporary unavailable).

In a non-degraded storage unit, "data object A" would typically be stored by DS processing unit 16-1 in one or more memories in DS unit 904-1 (target DS unit) as encoded data slices (FIG. 3-6) for a namespace range. DS unit 904-1 can, in one embodiment, include a set of memories 1-$n$ each with processing module 50 and memory 88 for storing encoded data slices of the data object. Requests, such as "store data object A", that are received by DS processing unit 16-1, while one or more memory devices within storage unit 36 are in a degraded state, may be rejected or otherwise fail. To prevent these rejection/failure conditions, a higher operational layer "redirect module" 902-1 is added to the DS processing unit. Memory access requests to DS processing unit 16-1 include any of read, delete, move, rebuild, etc., and are all considered within the scope of the descriptions herein. In addition, the term target refers to an intended destination storage location and may equally be applied to a DS unit, specific memory devices, specific memory locations, specific memory addresses, a range of specific memory addresses or multiple ranges of specific memory addresses within a DS unit.

Redirect module 902-1 (redirect processing module) tracks at least a state/mode of one or more memory devices within DS units (904-1). Requests sent to a DS processing unit are first handled by the redirect module. The redirect module then ascertains whether or not a target storage location of the DS unit is in a state (not degraded) where it can successfully complete the request. If the request is determined to not be able to be completed by the DS unit, either because it is currently or is about to enter a degraded state (e.g., full), then the redirect module identifies memory within a failover DS unit 906 that can complete the request.

The original storage request can be handled in multiple different ways. If the memory device (memory 2) is partially degraded, but is otherwise operable/available, DS unit 904-1 (or memory 2) directly forwards (905) the memory access request (e.g., write) for the received encoded data slices of data object A to the identified failover DS unit for storage (e.g., failover memory 2). However, if the memory device (memory 2) is partially degraded, but is not otherwise operable/available, DS processing unit 16-1 unit redirects the request for memory access for the encoded data slices of data object A to the identified failover DS unit for storage (e.g., failover memory 2). In this way, the DS unit can suffer memory faults, upgrades, or other conditions transparently to external requesters with zero downtime or interruption.

FIG. 9B is a schematic block diagram of a dispersed/distributed storage network (DSN) utilizing failover DS units for situations where a DS unit has a full failure in one or more of its memory devices (e.g., hard drive). In particular, a system and method is presented for use in conjunction with one or more functions and features described in conjunction with FIGS. 1-2, 3-8 and also FIGS. 9A and 9C.

This embodiment of a dispersed storage network (DSN) includes network 24 of FIG. 1, a plurality of memories 1-$n$ located in DS unit 904-1. DS processing unit 16-1 (computing device) includes DS client module 34 and computer memory (54—FIG. 2, not shown). Each storage unit 904-1 includes processing module 50 and memory 88 (e.g., hard drive, static memory, solid state memory, optical storage, etc.). Hereafter, each DS unit may be interchangeably referred to as a storage unit 36 and each storage set may be interchangeably referred to as a set of storage units.

From time-to-time, one or more memory devices in a target DS unit 904-1 may enter a degraded mode or a degraded state. Examples of these degraded modes/states include: when one or more memory devices within DS unit 904-1 are undergoing an update or upgrade, is approaching a full status or is full, restarting or resetting its state, suffers an irrecoverable fault, or when the storage unit is initializing, etc. In general, a degraded mode/state includes allowances for limited continued usage of the memory devices, but with lower performance (e.g., not able to process all requests) or even with severe or minimum performance (e.g., temporary unavailable).

In a non-degraded storage unit, "data object A" would typically be stored by DS processing unit 16-1 in one or more memories in DS unit 904-1 as encoded data slices A (namespace range). DS unit 904-1 can, in one embodiment, include a set of memories 1-$n$ each with processing module 50 and memory 88 for storing encoded data slices of the data object. Requests, such as "store data object A", that are received by DS processing unit 16-1, while one or more memory devices within storage unit 36 are in a degraded state, may be rejected or otherwise fail. To prevent these rejection/failure conditions, a higher operational layer "redirect module" 902-1 is added to the DS processing unit. Memory access requests to DS processing unit 16-1, such as read, delete, move, rebuild, etc., are considered within the scope of the technical descriptions herein.

Redirect module 902-1 (redirect processing module) tracks at least a state/mode of one or more memory devices within DS units (904-1). Requests sent to a DS processing unit are first handled by the redirect module. The redirect module then ascertains whether or not a target storage location of the DS unit is in a state (not degraded) where it can successfully complete the request. If the request is determined to not be able to be completed by the DS unit, either because it is currently or is about to enter a degraded state, then the redirect module identifies memory within a failover DS unit 906 which can complete the request.

If the memory device (memory 2) is fully degraded (e.g., offline), the DS processing unit 16-1 unit forwards the encoded data slices for a namespace of data object A to the identified failover DS unit for storage (e.g., failover memory 2). In this way, the DS unit can suffer memory faults, upgrades, or other conditions transparently to external requesters with zero downtime or interruption. In addition, based on the fully degraded status, additional encoded data slices B previously stored on memory 2 can be identified as needing to be rebuilt (now missing). In one embodiment, DS processing unit 16-1 rebuilds the encoded data slices B and redirects them to the failover DS unit 906-1 (shown stored in failover memory 2). In another embodiment, a request for rebuilding encoded data slices B is forwarded to integrity processing unit 20 or managing unit 18 for a rebuild of these encoded data slices. Rebuilt encoded data slices B are then forwarded to failover memory 2 either directly (not shown) or through redirect module 902-1.

Figure 9C:
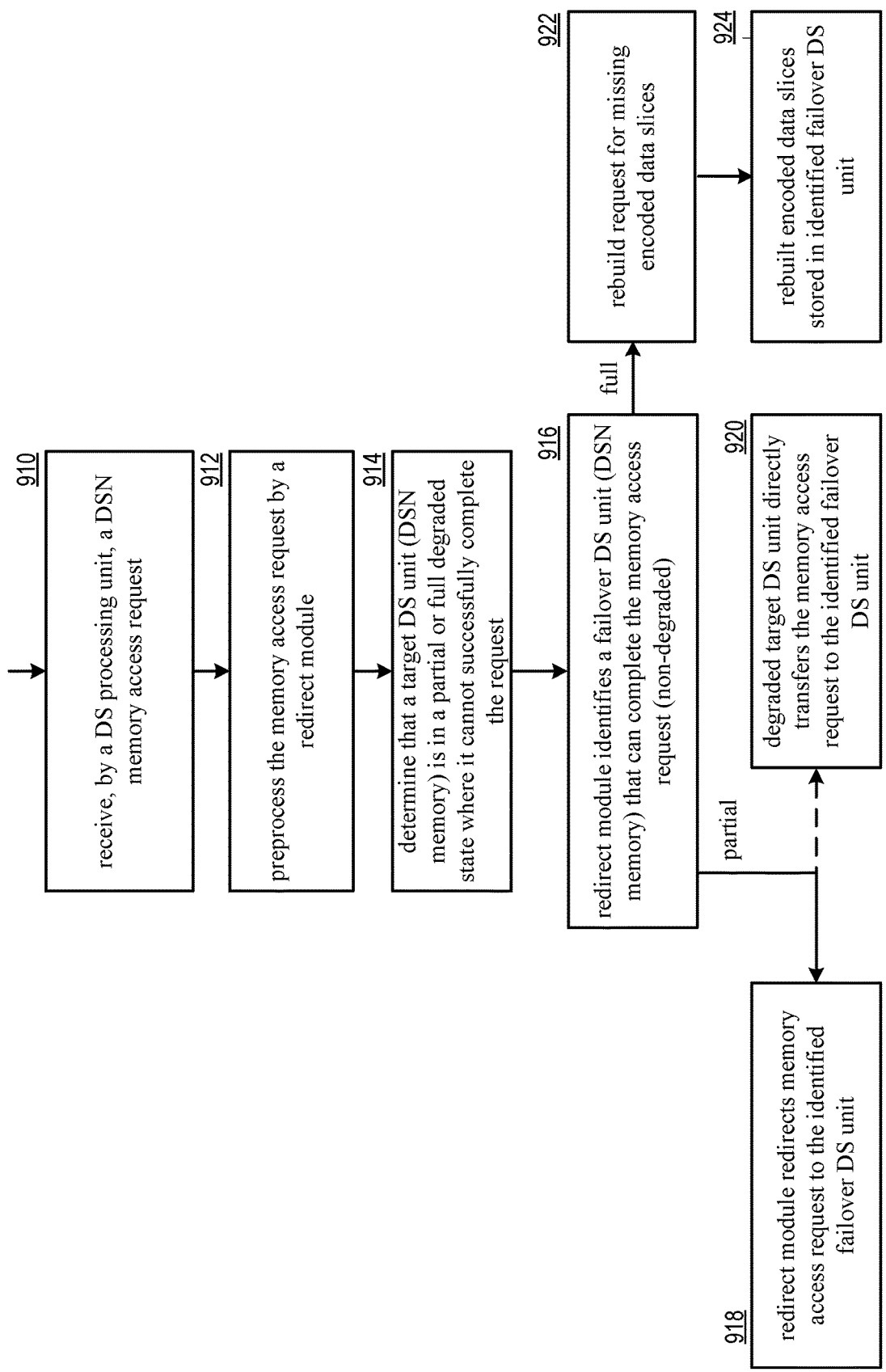
FIG. 9C is a diagram illustrating an example of implementing DSN failover units in accordance with the present invention.

FIG. 9C is a flowchart illustrating an example method of handling degraded memory conditions using a redirect module in accordance with the present invention. In particular, a method is presented for use in conjunction with one or more functions and features described in conjunction with FIGS. 1-2, 3-8 and also FIGS. 9A and 9B.

The method is for execution by one or more processing modules of one or more computing devices of a dispersed storage network (DSN). The method begins, in step 910, by receiving a DSN memory access request, such as to store data object A. The request is made to DS processing unit 16-1 for storage in potentially degraded associated DS unit 904-1 (e.g., memory 2 is in a potentially degraded mode/state). For example, the DS Processing unit receives a read, write (store), delete, move, or rebuild request. The method continues in step 912 by processing the requests received by a DS processing unit by a redirect module (preprocessing) to determine if a target DS unit or a failover DS unit have one or more potentially degraded (failed) memory devices. For example, the redirect module comprises an upper operational layer added to the DS processing unit or can, in an alternative embodiment, be a separate processing module external to the DS processing unit, but part of the DSN.

The method continues in step 914 by determining whether the DS unit (904-1) is in a non-degraded state where it can successfully complete the request or is in a degraded mode/state (fully or partially degraded). Examples of a degraded modes/state include: when one or more memory devices within DS unit 904-1 (storage unit 36) is undergoing an update or upgrade, is approaching a full status or is full, is restarting or resetting its state, suffers an irrecoverable fault, or when the storage unit is initializing, etc. In general, a partially degraded mode/state includes allowances for limited continued usage of the storage devices, but with lower performance (e.g., not able to process all requests) or even with severe or minimum performance (e.g., temporary unavailable).

The method continues, in step 916, when it is determined that the DS unit cannot complete the memory access request and is in a fully degraded state by identifying another DS unit (failover DS unit (906-1)) that can complete the request. The memory access request is than redirected, in step 918, by forwarding encoded data slices of a namespace range of the request to the identified failover DS unit. The method continues, in step 920, when the memory of the DS processing unit is in a partially degraded state (still operational) and can complete the storage request itself by transferring the request directly to the DS failover unit to be stored in an associated memory device.

The method continues, in step 922, when the degraded mode/state is determined to be fully degraded, by requesting a rebuild of presently stored encoded data slices (B) in the fully degraded memory device. The rebuilt encoded data slices B are then stored, in step 924, in the failover DS unit. While shown for illustration purposes as storage of encoded data slices in a single memory 2, encoded data slices can be redirected/rebuilt as sets of encoded data slices to multiple failover DS units and/or memory devices.

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   receiving a DSN memory write request;
   detecting, by a redirect module, a dispersed storage (DS) unit within the DSN having a degraded memory device, the dispersed storage DS unit being a target of the DSN memory write request;
   determining, by the redirect module, whether the degraded memory device is in a partial degraded state or a full degraded state;
   tracking, by the redirect module, namespace ranges of encoded data slices intended for access in the degraded memory device;
   identifying, by the redirect module, a failover DS unit that can complete the DSN memory access request; and
   redirecting the DSN memory write request for the encoded data slices reflected by the namespace ranges from the degraded memory device to a memory device of the failover DS unit.

2. The method of claim 1, wherein the redirecting further comprises sending, via the DS unit having the degraded memory device, the encoded data slices reflected by the namespace ranges directly to the failover DS unit.

3. The method of claim 1, wherein a number of failover DS units is scaled to meet ongoing demand of degraded memory devices in the DSN.

4. The method of claim 1 further comprises retrieving, by a DS processing unit, encoded data slices reflected by the namespace ranges from the failover DS unit directly based on a DSN memory read request of the encoded data slices reflected by the namespace ranges.

5. The method of claim 1 further comprising requesting, by the DS unit having a failed memory device, the encoded data slices reflected by the namespace ranges directly from the failover DS unit based on a DSN memory read request.

6. The method of claim 1, further comprising detecting-a failure includes detecting that the degraded memory device is close to failure.

7. The method of claim 6 further comprising, upon detecting that the degraded memory device is close to failure, moving data from the degraded memory device to the failover DS unit.

8. The method of claim 7 further comprises designating the degraded memory device as fully failed so that it receives no further data.

9. The method of claim 8 further comprises, for the degraded memory device designated as fully failed, redirecting new encoded data slices to the failover DS unit.

10. The method of claim 9 further comprises rebuilding encoded data slices missing from the degraded memory device designated as fully failed using an IDA (information dispersal algorithm).

11. The method of claim 10 further comprises redirecting the rebuilt encoded data slices to the failover DS unit.

12. The method of claim 1, wherein the determining whether the degraded memory device is in the partial degraded state or the full degraded state comprises determining that the degraded memory device is in the partial degraded state allowing for limited continued usage of the degraded memory device, the method further comprising:
   determining that the target memory device of the DS unit is close to failure;
   automatically moving data from the target memory device of the DS unit to the failover DS unit of the DSN, wherein the DS unit is distinct from the failover DS unit; and
   designating the target memory device as a failed memory device such that the failed memory device receives no further data, wherein all new encoded data slices intended for storage in the DS unit are redirected to the failover DS unit by a DS processing unit.

13. A method for execution by one or more processing modules of one or more computing devices of a dispersed storage network (DSN), the method comprises:
   receiving a memory write request sent to a target dispersed storage (DS) unit while one or more memories of the target DS unit is in a potentially degraded state;
   preprocessing the memory write request to determine whether the one or more memories of the target DS unit is in a non-degraded state or a degraded state; and
   if the target DS unit is in the non-degraded state, transferring the memory write request to the target DS unit in one or more memories of the target DS unit; and
   if the target DS unit is in the degraded state, determining whether the degraded state is a partial degraded state or a full degraded state, identifying a failover DS unit that is in a non-degraded state and redirecting the memory write to the failover DS unit.

14. The method of claim 13, wherein the degraded state occurs when the one or more memories is: undergoing an update or upgrade; restarting its state; resetting its state; suffering an irrecoverable fault, or initializing.

15. The method of claim 13, wherein the preprocessing includes tracking at least one of the group consisting of: a state of the DS unit, a state of the one or more memories, and a state of the failover DS unit.

16. The method of claim 13, wherein, when the target DS unit is in the degraded state, the request cannot be completed by the target DS unit.

17. The method of claim 13, wherein the degraded state is determined when the one or memories are about to enter the degraded state.

18. The method of claim 13 further comprises, for a degraded state designated as fully failed, redirecting new encoded data slices to the failover DS unit.

19. The method of claim 18 further comprises rebuilding encoded data slices missing from the memory device, designated as fully failed, using an IDA (information dispersal algorithm).

20. A computing device of a group of computing devices of a dispersed storage network (DSN), the computing device comprises:

an interface;

a local memory; and a redirect processing module operably coupled to the interface and the local memory, wherein the redirect processing module functions to:

receive a memory write request for a target memory device that is in a potentially degraded state;

process the memory write request to determine whether the target memory device is in a non-degraded state or degraded state; and if the target memory device is in the non-degraded state, transfer the memory write request as encoded data slices of a namespace range to the associated DS unit in one or more memories of the associated DS unit; and if the target memory device is in the degraded state, determine whether the degraded state is a partial degraded state or a full degraded state, identify a failover memory device that is in a non-degraded state, and redirect the memory write request by forwarding the encoded data slices of a namespace range of the memory write request to the failover memory device.

* * * * *